April 10, 1928.
L. BINGER
1,665,873
PLANTER ATTACHMENT FOR PLOWS
Filed March 16, 1925
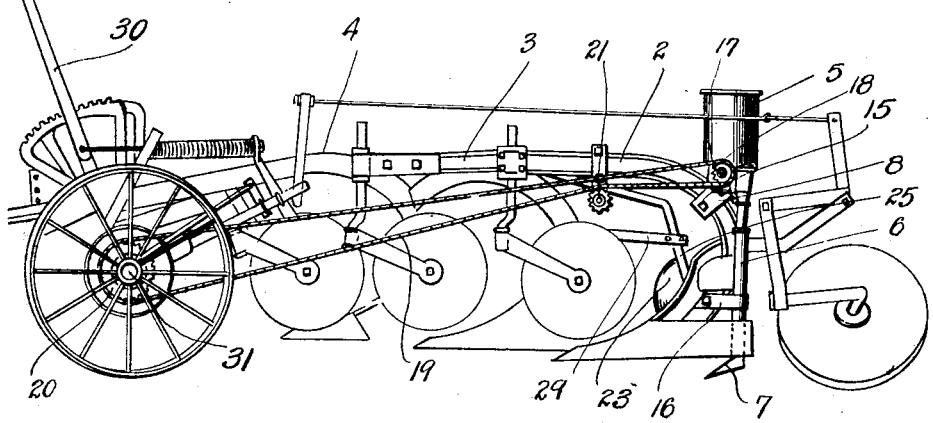
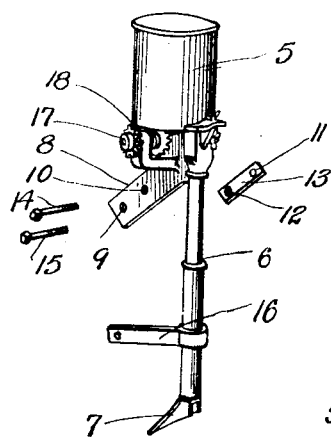
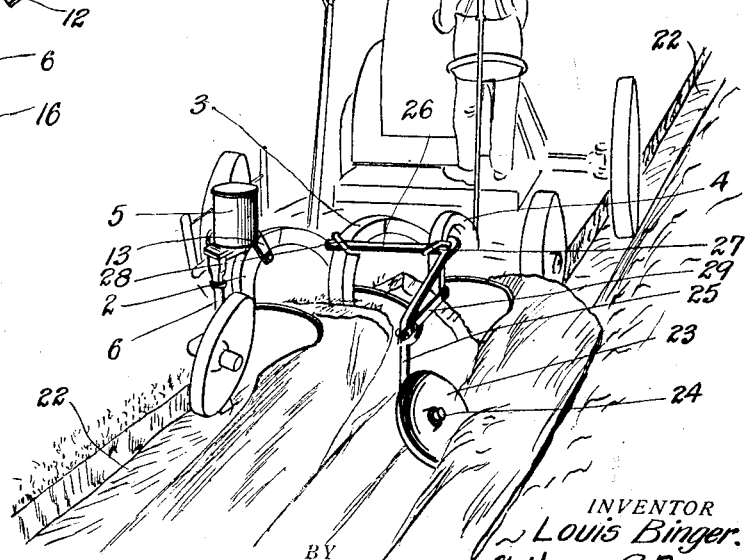
INVENTOR
Louis Binger.
BY
ATTORNEY Patented Apr. 10, 1928.

1,665,873

UNITED STATES PATENT OFFICE.

LOUIS BINGER, OF NORTON, KANSAS.

PLANTER ATTACHMENT FOR PLOWS.

Application filed March 16, 1925. Serial No. 15,825.

This invention relates to a planter attachment for plows in multiple and it is particularly designed to be applied to a three bottom plow, the plows in the gang being arranged so that the combined widths of the plows and the spaces between them will be approximately equal to the distances between the rows of vegetation, for example corn. This is ordinarily about forty-two inches.

The seed box for the planter is fastened in position to drop the corn, or other seed, in rear of the first plow which opens up the furrow and adjacent to the last plow, and in rear thereof, is an uncovering disk which removes some of the earth deposited upon the seed by the last plow so that the seed will not remain too deep in the ground.

The invention is especially designed for use with tractor drawn plows so the dropper for the seed box can be operated from one of the wheels of the plow.

There are certain novel details of construction of my invention which will be specifically described hereinafter, reference being had to the following description in connection with the accompanying drawings, in which—

Fig. 1 is a side elevational view of a gang of plows with my invention applied.

Fig. 2 is a rear perspective view of the invention applied, and

Fig. 3 is a perspective view of the seed box or hopper, the boot for delivering the seed and a sub-soiler, one of the clamping members and the fastening means therefor being shown detached.

The tractor 1 may be of conventional construction and attached thereto is shown a gang of plows, there being three, the beams being indicated at 2, 3 and 4. This is conventional construction. To one of the beams is fastened the seed box or hopper. The seed box should be fastened to the beam of the first plow 2 so as to drop the seed in the rear of the plow which opens up the furrow. The hopper 5 has a boot 6 depending therefrom with a sub-soiler 7 at the lower end. The hopper 5 is rigid on the bracket arm 8 having openings 9 and 10 which coincides with the openings 11 and 12 on the clamping plate 13. The bracket arm 8 may rest against one side of the plow beam 2, the clamping plate 13 against the other, so that the beam can be clamped between the members 8 and 13 when the fastening devices 14 and 15 are in place. The boot 6 is held rigidly by a stay arm 16 which may be fastened to the front plow in any appropriate manner. The seed dropper may be of conventional construction located upon a shaft 17 carrying a sprocket 18 around which passes a chain 19, the chain 19 also passing around a sprocket 20 on one of the wheels of the plow, and if desired an idler 21 may be carried by the plow beam 2 as a slack take-up for the chain 19. The subsoiler 7 on the end of the boot 6 will open up the bottom of the furrow made by the first plow in advance of the deposition of the seed. The plows 3 and 4 plow the ground at the same time that the corn is being dropped in the furrow 22, made by the plow 2, so that the ground between the rows will be plowed simultaneously with the dropping of the corn seed. The last plow in the row will throw dirt or soil over into the furrow 22, made by the plow 2, during a previous parallel travel of the gang of plows, so the furrow containing the corn seed will be filled with more earth than good practice dictates, therefore, in order to insure that the corn seed is at the proper depth I provide an earth removing disk 23 on an axle 24 carried by the bracket arm 25 having a right angular extension 26 fastened to the beams of the plows 3 and 4 by U-bolts 27 and 28. The bracket arm 25 is braced by a brace bar 29 fastened to the bracket arm 25 and to the beam of the plow 4.

It will be apparent that the attachment may be easily applied to and removed from the gang of plows according to whether the plows are to be used merely for plowing or whether it is desired to plant the seed at the same time the plowing is accomplished, and it will be further apparent that the plowing attachment is simple and inexpensive to construct and that it may be sold independently of the plows to be attached without the necessity of employing special tools or rearranging the plow construction.

While I have described the invention as applied to a single gang of three plows it is obvious that more than one gang of plows may be drawn by a single tractor, so I do not wish to be limited to the use of the invention on a single gang.

In actual practice the sprocket 20 will be mounted on its shaft so that when the lever 30 is swung forward to raise the plows and seed dropper the sprocket 20 will be thrown out of clutch engagement with the shaft 31, During this time, of course, the chain 19 will not be driven, consequently the seed dropper will not operate. When the lever 30 is swung rearwardly the plows, or ground working tools, will be lowered into ground working positions, the clutch being thrown in permitting the chain to be driven to operate the seed dropper. I have not shown specifically a form of clutch as the particular form of clutch is immaterial.

What I claim and desire to secure by Letters Patent is:—

In combination with a gang plow comprising a plurality of plows arranged in gang formation, a seed distributor located with relation to the inner furrow producing plow to deposit seeds in the furrow produced by said plow and a furrowing disk positioned with relation to the outermost plow of the gang for removing the excess earth applied to the seeded furrow by said outer plow during the next succeeding traversal of the gang plow across the field.

In testimony whereof I affix my signature.

LOUIS BINGER.